United States Patent
Österling et al.

(10) Patent No.: US 8,824,322 B2
(45) Date of Patent: Sep. 2, 2014

(54) CONTROLLING CELL ACTIVATION IN A RADIO COMMUNICATION NETWORK

(75) Inventors: Jacob Österling, Järfälla (SE); Walter Müller, Upplands Väsby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 504 days.

(21) Appl. No.: 13/264,998

(22) PCT Filed: Apr. 20, 2009

(86) PCT No.: PCT/SE2009/050400
§ 371 (c)(1),
(2), (4) Date: Oct. 18, 2011

(87) PCT Pub. No.: WO2010/123417
PCT Pub. Date: Oct. 28, 2010

(65) Prior Publication Data
US 2012/0044824 A1    Feb. 23, 2012

(51) Int. Cl.
H04L 1/00 (2006.01)
H04W 4/00 (2009.01)
H04W 52/02 (2009.01)
H04W 8/24 (2009.01)
H04W 8/20 (2009.01)
H04W 88/10 (2009.01)

(52) U.S. Cl.
CPC ............ H04W 52/0225 (2013.01); H04W 8/24 (2013.01); H04W 8/205 (2013.01); H04W 52/0206 (2013.01); H04W 88/10 (2013.01)
USPC ........................................ 370/252; 370/331

(58) Field of Classification Search
None
See application file for complete search history.

(56) References Cited

U.S. PATENT DOCUMENTS 5,991,629 A * 11/1999 Agrawal et al. ............... 455/446
2005/0026616 A1 2/2005 Cavalli et al.
(Continued)

FOREIGN PATENT DOCUMENTS

| CN | 1582054 A | 2/2005 |
| CN | 101272621 A | 9/2008 |
| CN | 101347008 A | 1/2009 |
| DE | 102005051291 A1 | 5/2007 |

OTHER PUBLICATIONS

3rd Generation Partnership Project. "Dynamic Setup of HNBs for Energy Savings and Interference Reduction." 3GPP TSG RAN WG3 Meeting #61, R3-081949, Jeju Island, Korea, Aug. 18-22, 2008.
Carstens, J. "A Method for Interference Control and Power Saving for Home Access Point." ip.com Technical Disclosure, IPCOM000160756D, Dec. 13, 2007.

(Continued)

*Primary Examiner* — Kevin C Harper
*Assistant Examiner* — Peter Chen
(74) *Attorney, Agent, or Firm* — Coats & Bennett, PLLC

(57) ABSTRACT

In a radio communication network there are a number of radio base stations, at least one of which belongs to a first radio access network and manages at least one active cell serving user equipment. It is determined whether a passive other cell of a radio base station belonging to a second overlapping radio access network should be activated based on information representative of radio access preferences of the user equipment (S1). When it is determined that the passive other cell should be activated, the passive cell is requested to be activated by causing the corresponding radio base station belonging to the second overlapping radio access network to start transmission of cell-defining information (S2).

20 Claims, 13 Drawing Sheets

(56) References Cited

U.S. PATENT DOCUMENTS

| | | | |
|---|---|---|---|
| 2007/0066329 A1 | 3/2007 | Laroia et al. | |
| 2009/0290555 A1* | 11/2009 | Alpert et al. | 370/331 |
| 2009/0290561 A1 | 11/2009 | Kleindl | |
| 2010/0056184 A1* | 3/2010 | Vakil et al. | 455/456.5 |
| 2012/0004009 A1* | 1/2012 | Lindoff et al. | 455/522 |
| 2012/0094661 A1* | 4/2012 | Frenger et al. | 455/434 |

OTHER PUBLICATIONS

Feng, S. "Self-Organizing Networks (SON) in 3GPP Long Term Evolution." novel mobile radio (no|mo|r) research, Nomor Research GmbH, May 20, 2008.

* cited by examiner

CONTROLLING CELL ACTIVATION IN A RADIO COMMUNICATION NETWORK

TECHNICAL FIELD

The present invention generally relates to radio communications technology and operations in a radio communication network, and in particular to the issue of controlling cell activation in such a radio communication network.

BACKGROUND

Today, radio communication networks typically comprise radio base stations with associated cells that are continuously active. This means that the radio base stations more or less continuously transmit certain forms of signals in the cells to assist user equipment present in the radio communication network or user equipment attempting to connect thereto. Examples of such signals are reference signals, often denoted pilot signals, synchronization signals and the broadcast channel. These signals are used for many purposes including downlink (DL) channel estimation, cell synchronization in connection with power-up of user equipment and mobility cell search. However, the transmission of these signals means that the power consumption will be quite significant, and it may be advisable to try to reduce the power consumption in the network.

In Wideband Code Division Multiple Access (WCDMA) a NodeB for a cell can be put to sleep at night by switching off the power supply to the NodeB in order to reduce power consumption. In the morning, the NodeB is turned on again by once more providing power supply to the NodeB. Unfortunately, this means that no communication services can be offered during the night since the NodeB is out-of-service in that period of time.

SUMMARY

There is a demand for more efficient ways of reducing the power consumption, while still ensuring efficient communication services.

It is a specific object to provide an efficient method of controlling activation of at least one cell in a radio communication network.

It is another specific object to provide an apparatus for controlling activation of at least one cell in a radio communication network.

Yet another object is to provide a network unit comprising such an apparatus for controlling activation of at least one cell in a radio communication network These and other objects are met by embodiments as defined by the accompanying patent claims.

The possibility of temporarily inactivating cells into passive cells, where their associated radio base stations do not transmit any of the above-mentioned signals is sometimes advantageous. Such a cell inactivation could then be used for example during periods in which there is no need, or at least very low need, for radio communication services in the cells. Inactivating cells and turning off the transmitters of the passive cells not only saves power for the radio base stations but also contributes to lowering the total interference level in the radio communication network.

The inventors have recognized that the inactivation of cells during periods of no or low need for radio communication services not only achieves several advantages for the operators of the radio communication networks but also brings about new challenges. For instance, today there is no efficient solution of how to activate a passive cell when a potential need for radio communication services arises in the area of the passive cell. Furthermore, there is no efficient solution to inform user equipment of the existence of passive cells in the radio communication network.

In a first aspect, there is provided a method of controlling activation of at least one cell in a radio communication network having a number of radio base stations. At least one of the radio base stations belongs to a first radio access network and manages at least one active cell serving one or more user equipment. In this context, the method is based on determining whether a passive other cell of a radio base station belonging to a second overlapping radio access network should be activated based on information representative of radio access preferences of the user equipment. The radio base station belonging to the second overlapping radio access network is currently not transmitting any cell-defining information for the passive other cell. Further, the method continues by requesting, when it is determined that the passive other cell should be activated, the passive cell to be activated by causing the corresponding radio base station belonging to the second overlapping radio access network to start transmission of cell-defining information.

In this way the invention allows cells to stay passive for as long as possible to reduce power consumption, and allows passive cells to be activated when needed to ensure satisfactory communication services for the users.

In a second aspect, there is provided an apparatus for controlling activation of at least one cell in a radio communication network comprising a number of radio base stations. At least one of the radio base stations belongs to a first radio access network and manages at least one active cell serving one or more user equipment. The apparatus comprises a selector for selecting, based on information representative of radio access preferences of the user equipment, at least one passive other cell of a radio base station belonging to a second overlapping radio access network for activation. The radio base station belonging to a second overlapping radio access network is currently not transmitting any cell-defining information for the passive other cell. The apparatus also comprises an activation controller for requesting the selected passive other cell(s) to be activated by causing the corresponding radio base station(s) belonging to the second overlapping radio access network to start transmission of cell-defining information.

In yet another related aspect, there is provided a network unit that comprises the above apparatus for controlling activation of at least one cell in a radio communication network. The network unit may for example belong to a radio access network and/or a core network associated with the radio communication network.

Other advantages offered by the invention will be appreciated when reading the below description of embodiments of the invention.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
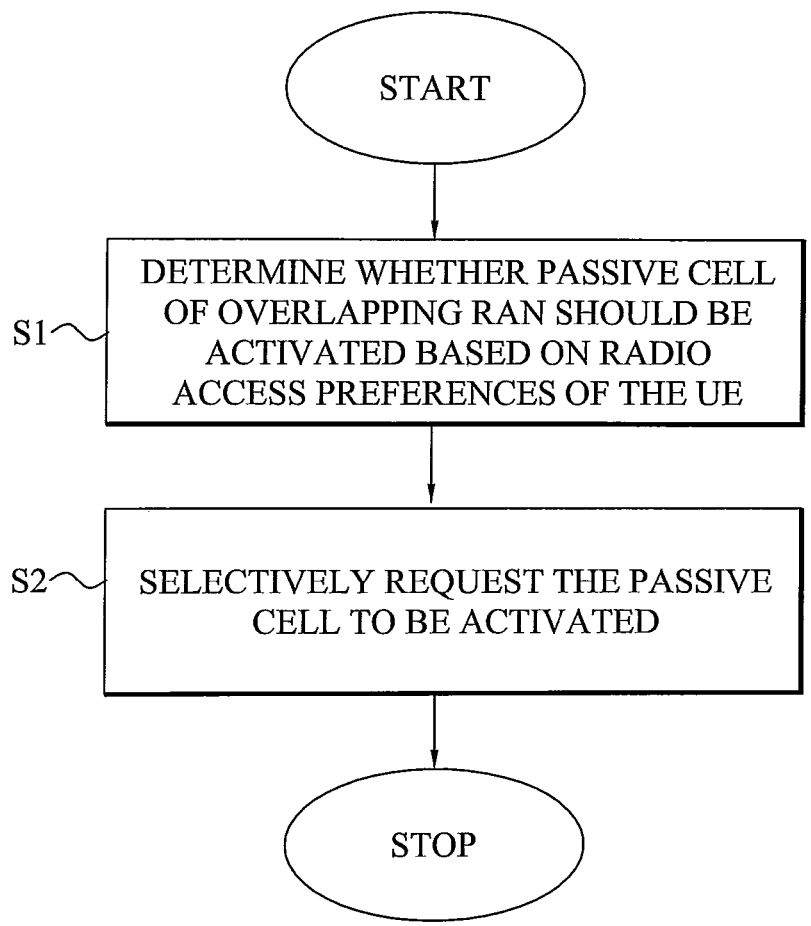
FIG. 1 is a flow diagram illustrating a method of controlling cell activation according to an exemplary embodiment.

Throughout the drawings, the same reference numbers are used for similar or corresponding elements.

Embodiments as disclosed herein relate to controlling cell activation in a radio communication network having at least one passive cell.

In current cellular radio communication networks, the radio base stations continuously transmit certain forms of signals in their respective cells. Examples of such signals are pilot signals, such as reference and/or synchronization signals, and the broadcast channel. These signals are used for many purposes, including:

Mobility cell search: User equipment regularly scans for neighboring cells. The synchronization signals transmitted in a neighboring cell are used to find and synchronize to a potential neighbor. Active user equipment typically reports the signal strength of the neighboring cell to the network, which takes a decision if the user equipment should be handed over to the candidate cell.

Initial cell search: At power-up user equipment tries to find potential cells to connect to by scanning for synchronization signals. Once a cell is found and synchronization is obtained, the user equipment reads the broadcast channel and pilot signal(s) transmitted in the cell to obtain the necessary system information and normally performs a random access to connect to the network.

Data reception: Active user equipment needs to perform channel estimation, typically based on the pilot reference signals, to receive the transmitted data. The pilot reference signals may also be used for estimation and reporting of the downlink channel quality to support radio base station functions such as channel-dependent scheduling.

User equipment synchronization: Idle user equipment needs synchronization signals and/or reference signals to be able to keep in sync with the network, i.e. once waking up from paging DRX (Discontinuous Reception) cycles, these signals are used to fine-tune timing and frequency errors etc.

When there are active users in a cell, the cost of transmitting the signals discussed above is justified. However, when there are no active users in the cell, there is in principle no need for these signals. This is especially true in scenarios with dense deployment of cells, i.e. in case where micro cells are placed under macro cells. In such scenarios, the micro cells may for example be used to cope with high load scenarios, and the energy spent on transmitting these signals from the micro cells in low load scenarios is in essence wasted.

In absence of active user equipment in a cell, or at least a very low number of active user equipment, there is in principle no need to transmit anything. This allows the radio base station to turn off the power amplifier, the baseband processing as well as the transmission equipment.

The cell managed by the radio base station in essence becomes "idle" in the downlink. Such a cell is denoted a passive cell herein, although alternative terminology could also be used, such as sleeping cell or inactivated cell. The expression "passive cell" therefore also encompasses expressions such as idle, sleeping or inactivated cell.

As defined herein, a passive cell is a cell of the radio communication network for which the corresponding radio base station is currently not transmitting any cell-defining information for the cell. The cell-defining information includes, in particular, information to assist user equipment in finding the cell. It may also include information required by user equipment for identifying and actually locking to a cell. Cell-defining information typically comprises the information traditionally carried by the above-mentioned pilot signals, such as reference signals and/or synchronization signals, and optionally also information carried by the broadcast channel. In a particular exemplary embodiment, the cell-defining information includes at least synchronization signal information.

Note, however, that even though the radio base station does not transmit any cell-defining information for a passive, the radio base station may optionally still have its receivers switched on and can therefore receive data transmitted, for instance, by user equipment even though the transmitter or transmitters for the passive cell are switched off.

For the purposes of the present disclosure, a radio base station is assumed to serve one or more cells in the radio communication network. Thus, "radio base station" also refers to more recent entities, such as NodeB and eNodeB (evolved NodeB), which are capable of handling more than one cell, as well as other corresponding network nodes, such as a base transceiver station (BTS) and a base station (BS). Furthermore, the expression radio base station may also encompass wireless network nodes such as relays and repeaters and home base stations having a respective geographical serving area, i.e. a cell.

Similarly, "user equipment" will be used to indicate different types of radio terminals, such as mobile stations, mobile user equipments, laptops, etc. having functionality for wirelessly communicating with radio base stations in the radio communication network.

FIG. 1 is a flow diagram illustrating a method of controlling activation of at least one cell in a radio communication network according to an exemplary embodiment. The radio communication network comprises a number of radio base stations, at least one of which belongs to a first radio access network (RAN) and manages at least one active cell serving one or more user equipment. The method starts in step S1 by determining whether a passive other cell of a radio base station belonging to a second overlapping radio access network (RAN) should be activated based on information representative of radio access preferences of the user equipment (UE). The radio base station belonging to the second overlapping radio access network is currently not transmitting any cell-defining information for the passive other cell. Further, the method continues in step S2 by requesting, when it is determined that the passive other cell should be activated, the passive cell to be activated by causing the corresponding radio base station belonging to the second overlapping radio access network to start transmission of cell-defining information.

In this way the invention allows cells to stay passive for as long as possible to reduce power consumption, and allows passive cells to be activated when needed to ensure satisfactory communication services for the users.

For example, the information representative of radio access preferences of user equipment may include information representative of at least one of radio access capabilities, subscription and current service used by the user equipment. With regard to information representative of radio access capabilities, such information preferably includes information representative of expected or known radio access capabilities.

It may be beneficial to use information representative of an order of preference of radio access networks, as will be explained later on. For example, such information may include an indication that user equipment has a preference for the second overlapping radio access network over the first radio access network.

The first radio access network may be associated with a first radio access technology (RAT), whereas the second overlapping radio access network is associated with a second different radio access technology (RAT). Non-limiting examples of different radio access technologies (RATs) that can be combined include Global System for Mobile Communications (GSM), Wideband Code Division Multiple Access (WCDMA), Code Division Multiple Access 2000 (CDMA2000) or Time Division-Synchronous CDMA (TD-SCDMA) and Long Term Evolution (LTE). For example, the first radio access technology may be GSM, CDMA2000, TDSCDMA or WCDMA whereas the second radio access technology may be LTE. Other combinations are of course also possible including GSM as the first RAT and WCDMA as the second RAT.

It is also possible that the overlapping radio access network is of the same underlying radio access technology. By way of example, the first radio access network may be based on a given radio access technology operating at a first frequency and the second overlapping radio access network may based on the same radio access technology but operating at a second different frequency. Examples of different networks of the same underlying technology operating at different frequency ranges include LTE 700 MHz and LTE 2600 Hz.

Figure 2:
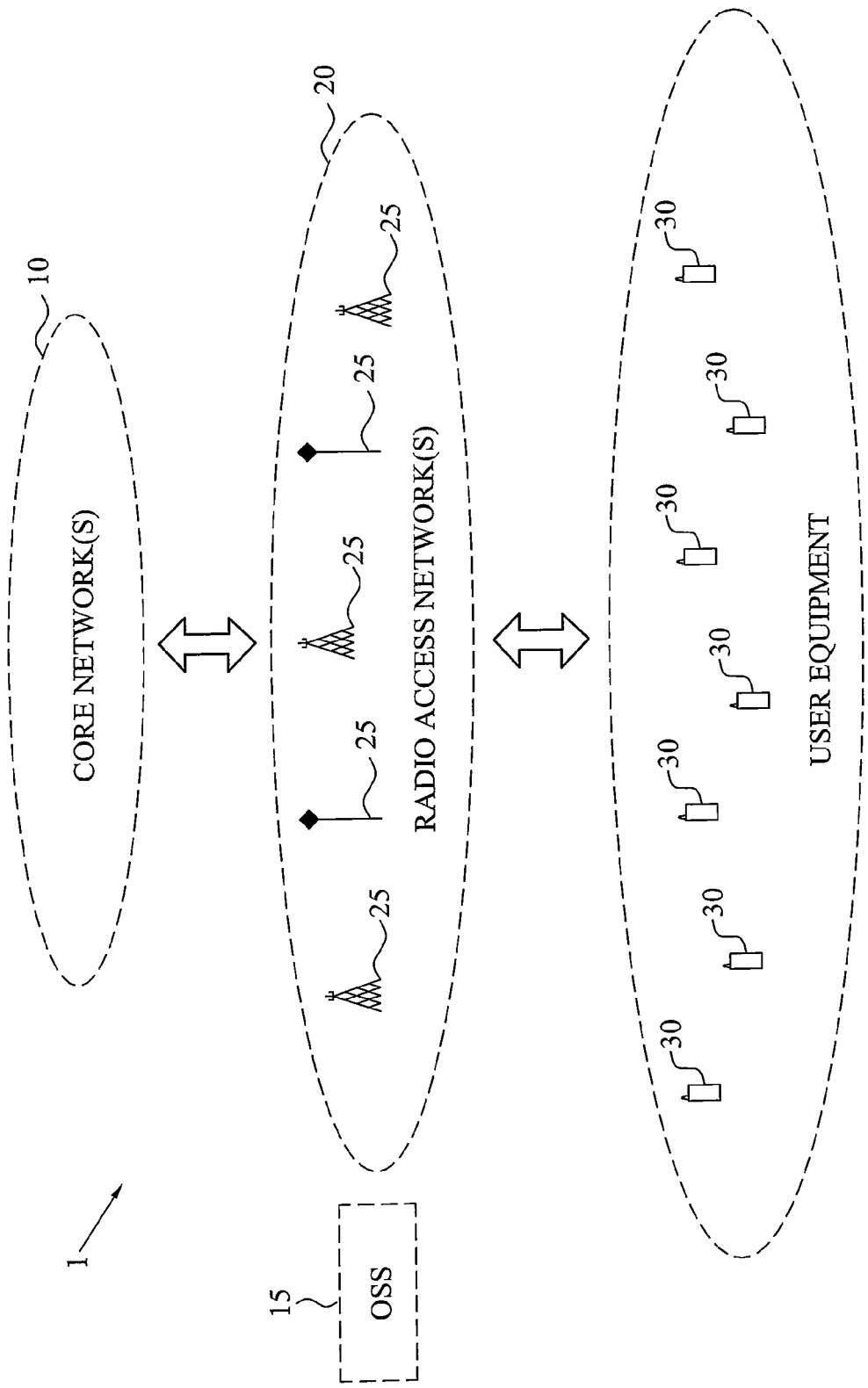
FIG. 2 is a schematic diagram illustrating a stratified view of an exemplary radio communication network including the core network level, the radio access network level and the user equipment level.

For a better understanding of the invention, it may be useful to continue with a brief network overview referring to FIG. 2.

FIG. 2 is a schematic diagram illustrating a stratified view of an exemplary radio communication network including the core network level, the radio access network level and the user equipment level. Basically, the radio communication network includes a core network 10, and one or more radio access networks 20 serving user equipment 30. The radio access network(s) 20 includes radio base stations 25, which may be of different types. Each of the radio access networks is associated with a conventional Operations Support System (OSS) 15.

Figure 3:
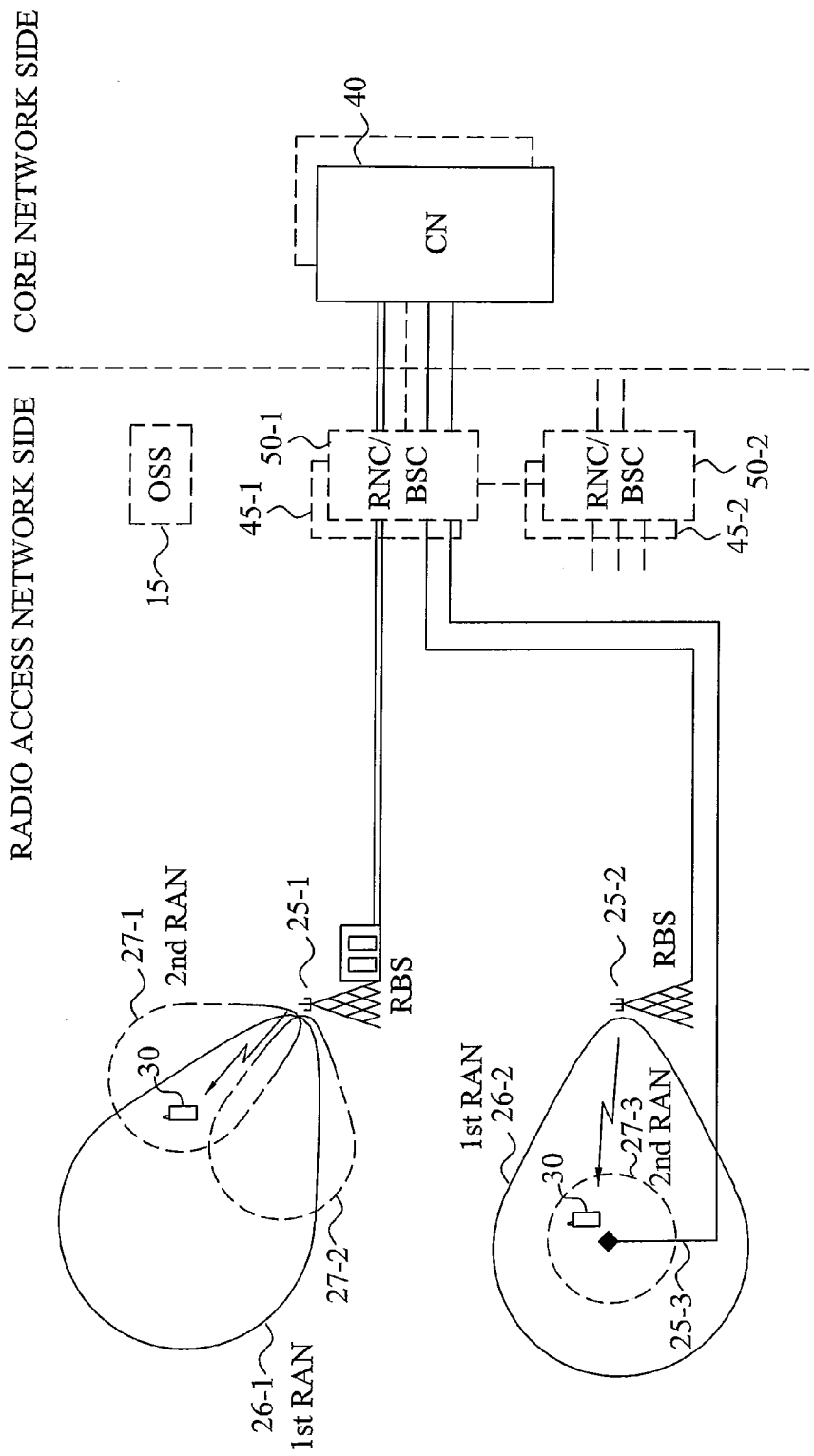
FIG. 3 is a schematic overview of an exemplary radio communication network including the radio access network side and the core network side.

FIG. 3 is a schematic overview of an exemplary radio communication network including the radio access network side and the core network side. In this example a radio base station (RBS) site 25-1 supports different radio access networks (RANs) and/or radio access technologies (RATs), and is therefore sometimes referred to as a co-sited RBS implementation, as will be explained in detail later on. In the present example, the RBS site 25-1 is operated for managing an active cell 26-1 of a first radio access network (RAN) that is capable of serving one or more user equipment 30 currently residing in the active cell 26-1. This means that the RBS site 25-1 transmits cell-defining information for the active cell 26-1 of the first RAN. The RBS site 25-1 also has the possibility of transmitting cell-defining information for one or more, two in the example of FIG. 3, other cells 27-1, 27-2 of a second different overlapping RAN. In an embodiment, these cells 27-1 and 27-2 are currently passive, implying that the RBS site 25-1 currently does not transmit any cell-defining information for the cells 27-1, 27-2. The passive cells 27-1, 27-2 are therefore invisible for user equipment 30 present in the area of or near a passive cell 27-1, 27-2.

A similar scenario can be seen with the radio base station (RBS) 25-2, which manages an active cell 26-2 of a first radio access network (RAN) serving user equipment 30, and the separate radio base station 25-3 with a currently passive cell 27-3 of a second radio access network (RAN).

In a possible scenario, one or more of the passive cells 27-1, 27-2 and 27-3 may be planned for particular services that cannot be handled or not handled sufficiently well by the active cells 26-1 and 26-2. A typical example could be when the passive cells 27-1, 27-2 and 27-3 are planned for a broadband access technology, which only needs to be active when a service requiring high bandwidth is required. If no such high bandwidth services are needed, the traffic is instead served by the active cells 26-1, 26-2 of the overlapping access network/technology.

For example, the active cell 26-1 and the relevant parts of the RBS site 25-1 may be of a given radio access technology, such as the Global System for Mobile Communications (GSM), Wideband Code Division Multiple Access (WCDMA), Code Division Multiple Access 2000 (CDMA2000) or Time Division Synchronous CDMA (TD-SCDMA), whereas the passive cells 27-1, 27-2 and the relevant parts of the RBS site 25-1 may be of another radio access technology, such as Long Term Evolution (LTE), capable of handling high bandwidth services. Similarly, the same may apply for the active cell 26-2 and the corresponding RBS 25-2, and the passive cell 27-3 and the corresponding RBS 25-3.

A further possible scenario could be that one or more of the passive cells 27-1, 27-2 and 27-3 are only activated if the need for radio communication services in one or more of the active cells 26-1, 26-2 increases so much that the traffic load becomes too large for the corresponding radio base stations to handle effectively. In such a case, some of the traffic could instead be handled by at least one of the passive cells 27-1, 27-2 and 27-3, which then need(s) to be activated.

It should be appreciated that in order to be useful for any of the above purposes, an area of a passive cell should cover, when activated, an area in which the considered user equipment is currently located or expected to be located within the near future.

It should also be understood that radio base stations may be capable of serving multiple, i.e. at least two, cells, of which a subset of one or more cells may be passive while another subset may be active.

As well-known to the skilled person, the architecture of the radio access network and core network will differ in dependence on the considered radio access technology. This means that the radio base stations in the schematic example of FIG. 3 may be connected to one or more Base Station Controllers (BSC) 45-1, 45-2 for GSM, one or more Radio Network Controllers (RNC) 50-1, 50-2 for CDMA-based networks, or directly to the corresponding core network 40 for LTE.

Figure 4:
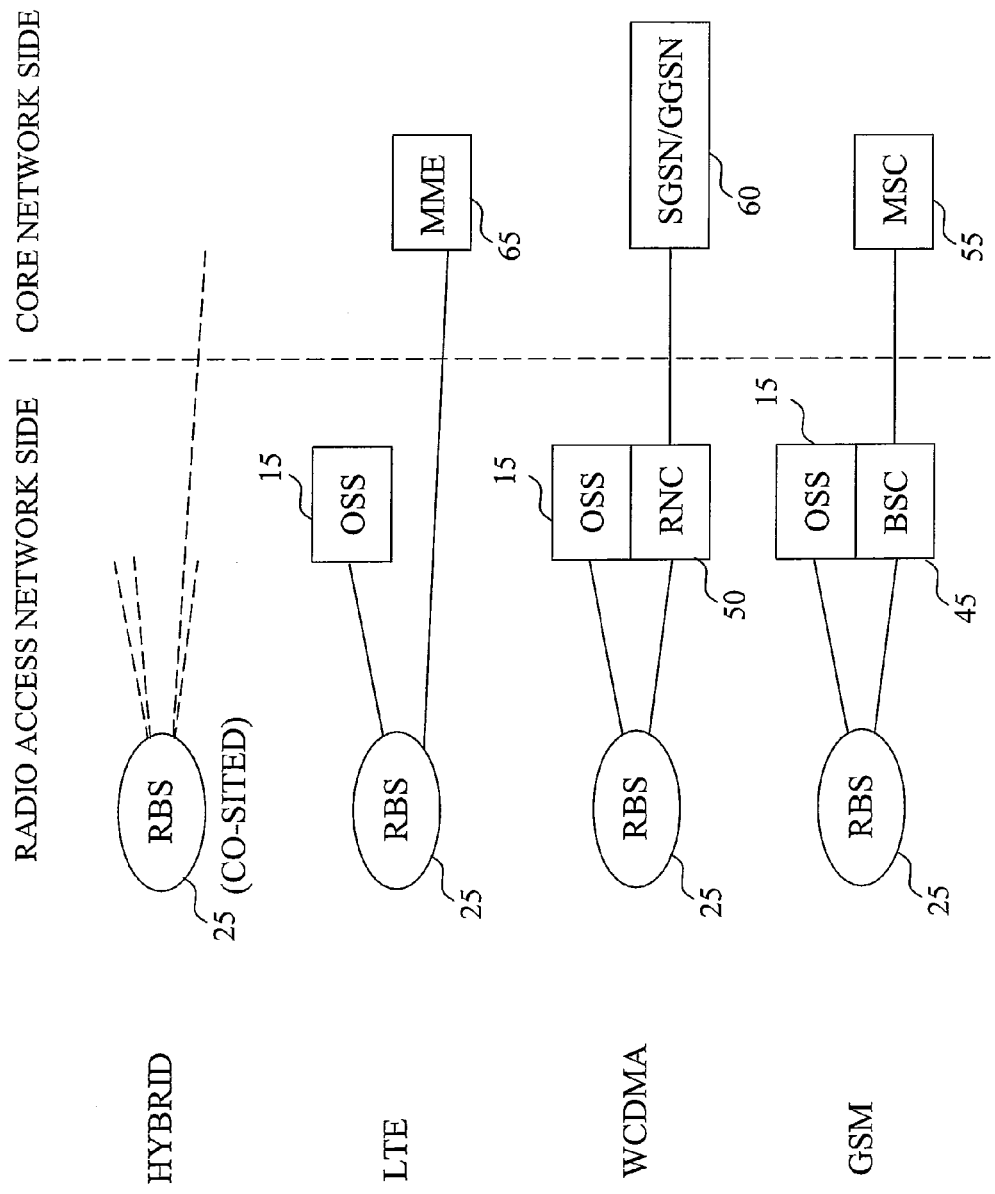
FIG. 4 is a schematic diagram illustrating relevant nodes on the radio access network side and the core network side, respectively, for a few examples of different types of radio communication networks.

FIG. 4 is a schematic diagram illustrating relevant nodes on the radio access network side and the core network side, respectively, for a few examples of different types of radio communication networks.

In GSM, for example, the radio access network (RAN) generally has two fundamental logical node types: the Radio Base Station (RBS) 25, and the Base Station Controllers (BSC) 45. The radio access network also has an associated Operations Support System (OSS) 15. The GSM core network 40 is based on the Mobile Switching Center (MSC) node 55, together with additional nodes such as the Home Location register (HLR) (not shown) and other conventional support units and/or nodes.

In CDMA-based networks, for example, the radio access network (RAN) generally has two fundamental logical node types: the Radio Base Station (RBS) 25, and Radio Network Controllers) (RNC) 50. The radio access network also has an associated Operations Support System (OSS) 15. The RBS 25 is often denoted NodeB.

The RBS/NodeB 25 is the logical node handling the transmission and reception for a set of one or more cells. Logically, the antennas of the cells belong to the NodeB 25 but they are not necessarily located at the same antenna site. The NodeB 25 typically owns its hardware but not the radio resources of its cells, which are owned by the RNC 50 to which the NodeB 25 is connected. This RNC-NodeB connection is effected using the known Iub interface.

Each RNC 50 in the radio communication network can normally connect to every other RNC 50 via the known Iur interface. Thus, the Iur interface is a network wide interface making it possible to keep one RNC 50 as an anchor point for user equipment and hide mobility from the core network.

The RNC 50 is the node connecting the radio access network to the core network via the known Iu interface. For WCDMA/HSPA, the core network is normally based on the GSM core network and therefore comprises two distinct domains; the circuit-switched (CS) domain with the Mobile Switching Centre (MSC), and the packet-switched (PS) domain with the Serving GPRS Support Node (SGSN)/Gateway GPRS Support Node (GGSN) 60. Common for the two domains is the Home Location Register (HLR) (not shown).

In LTE, for example, the radio access network (RAN) generally has a single fundamental type of node, namely the Radio Base Station 25, called eNodeB. The radio access network also has an associated Operations Support System (OSS) 15. Each eNodeB 25 is in charge of a set of one or more cells. The cells of an eNodeB 25 do not have to be using the same antenna site but can have separate dedicated antenna sites.

The eNodeB 25 is normally in charge of a number of functionalities, including single cell radio resource management (RRM) decisions, handover decisions, scheduling of user equipment in both uplink and downlink in its cells.

The known X2 interface connects any eNodeB in the radio communication network with any other eNodeB. This X2 interface is mainly used to support active-mode mobility but may also be used for multi-cell RRM functions. Another interface, the known S1 interface, connects the eNodeB 25 to the core network.

The core network for LTE is often denoted Evolved Packet Core (EPC) to indicate that it is a radical evolution from the GSM/General Packet Radio Service (GPRS) core network. The EPC is developed as a single-node architecture with all its functions in one node, the Mobility Management Entity (MME), except the Home Subscriber Server (HSS) (not shown) that is a node or database containing details of each user equipment subscriber that is authorized to use the LTE core network and the user plane gateways (not shown). The EPC connects to the LTE RAN via the-above mentioned S1 interface, to the Internet (not shown) via the known SGi interface and to the HSS (not shown) using the known S6 interface.

The exemplary procedures for cell activation according to embodiments of the invention may be implemented for execution in one or more network units associated with the radio communication network. If the cell activation procedure is implemented in more than one network unit, the result will be a distributed implementation.

For example, the determination of whether a passive other cell of a radio base station belonging to another overlapping radio access network should be activated, and the request for activation of the passive cell by causing the corresponding radio base station belonging to the overlapping radio access network to start transmission of cell-defining information may be performed by one or more network units of the so-called first radio access network currently serving the user equipment. This may be a radio base station (RBS), a base station controller (BSC) or a radio network controller (RNC) of the first radio access network. Typically, the serving radio base station may be suitable for executing the "remote" cell activation of a passive cell belonging to another overlapping radio access network.

In an exemplary embodiment, the network unit of the first radio access network receives information representative of radio access preferences of user equipment from a core network associated with the radio communication network. This information may for example be carried by Subscriber Profile ID for RAT/Frequency priority (SPID) 3GPP signaling from the core network, as will be explained in detail later on.

In addition to UE radio access preference information (such as information representative of at least one of radio access capabilities, subscription and current service of the UE) from the core network side, it is also possible and often advantageous to exploit information originating from the radio access network side, such as current UE position, signal strength indications, cell and/or cell plan information. In this regard, it may by way of example be important to exploit information representative of the number of user equipment, with radio access capabilities for the second overlapping radio access network, that are expected to be located in a passive cell when the cell is activated, and compare this number of user equipment to a given threshold to determine whether the passive cell should be activated. In this way, a passive cell will only be activated when a certain number of user equipment terminals having the right radio access capabilities are present in the cell or at least expected to be located in the cell when it is activated.

Alternatively, it is indeed possible to have the determination of whether a passive other cell of a radio base station belonging to another overlapping radio access network should be activated, and the request for activation performed by one or more network units of a core network associated with the radio communication network. This could for instance be the MME node, SGSN node, GGSN node, MSC node and/or a new dedicated node for cell activation purposes.

In yet another alternative implementation, the determination and the request are distributed between the core network side and the radio network side.

There are several different ways of causing a radio base station to start transmission of cell-defining information. A cell activation command is preferably signaled through proper control signal paths from the requesting network unit to the radio base station having a passive cell that needs to be activated. This may be inter-RBS signaling for co-sited base stations, inter-RAN signaling between the different radio access networks, CN-to-RAN signaling when the core network requests the cell activation, signaling via OSS, or even via random access signaling from user equipment.

The RAN serving the UE may have a list of radio base stations of the overlapping RAN serving the same area as the cell to which the UE is connected. This would be similar to the neighbor list, but with the difference that it includes radio base stations of one or more overlapping RANs.

If the RBS serving the user equipment is co-sited with the relevant RBS of the overlapping radio access network, the serving RBS can signal directly to the co-sited RBS to turn on its corresponding cell.

Activation of the passive cell can also be triggered by signaling to the corresponding radio base station belonging to the second overlapping radio access network via an Operations Support System (OSS) associated with the overlapping radio access network.

Yet another illustrative example includes signaling random access (RA) enabling information from the serving radio base station to the user equipment, which is located in the area of selected cell to be activated, and requesting the user equipment to transmit a random access (RA) to the radio base station of the second overlapping radio access network to trigger activation of the cell.

Figure 5:
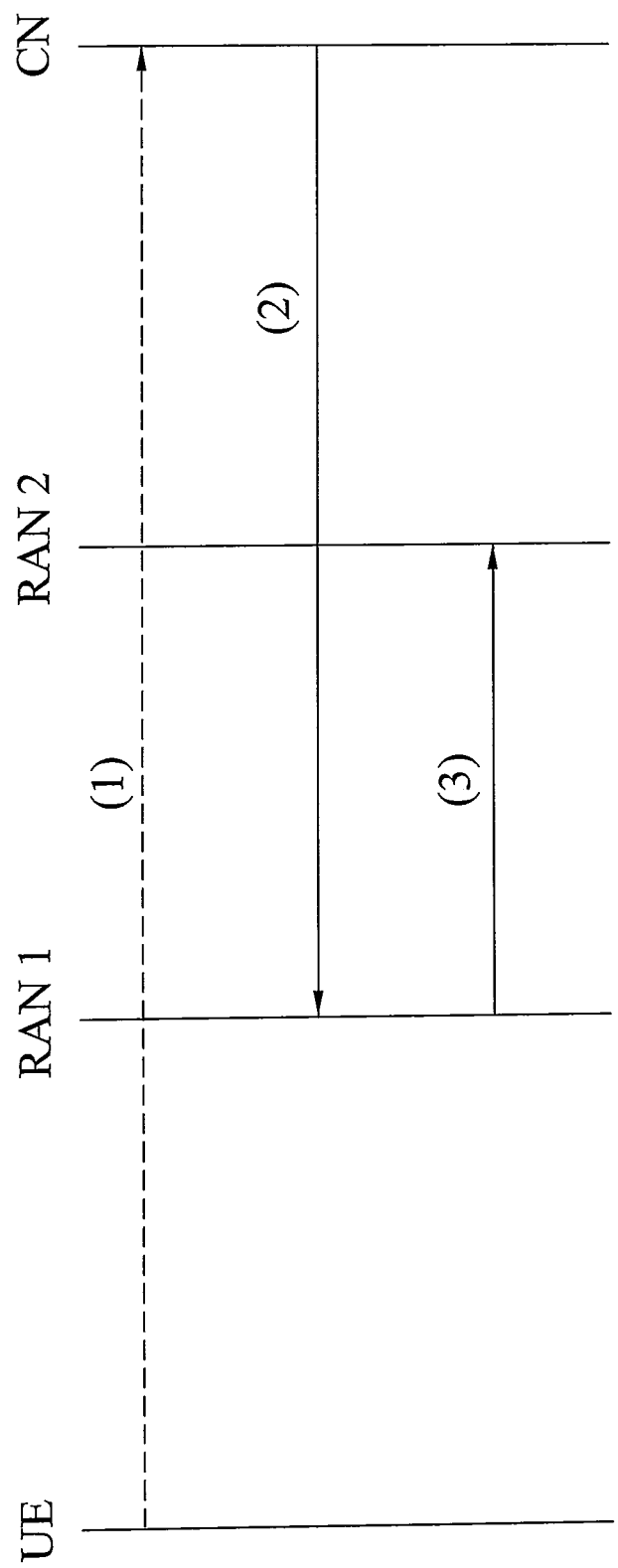
FIG. 5 is a schematic signal diagram according to an exemplary embodiment of the invention.

FIG. 5 is a schematic signal diagram according to an exemplary embodiment of the invention. It should be understood that the particular example of FIG. 5 merely serves to represent one of many possible ways of realizing the invention.

For example, when the UE is registering with the network, information (1) associated with the UE regarding radio access preferences is normally collected at the corresponding core network (CN). The core network can build a list of UE radio access preferences in different ways:

Have a default list for all UEs.
Have a list based on UE radio access capabilities.
Have a list based on UE radio access capabilities and the subscription of the UE.
Have a list based on UE radio access capabilities, subscription and the current service used by the UE.

The more specific the CN defines the list, the more power can be saved when executing the cell activation procedure of the invention.

In this example, a network unit, such as the serving RBS, of the first radio access network (RAN1) receives information (2) representative of radio access preferences of user equipment from the core network (CN), and this network unit then determines whether a passive cell of a second overlapping radio access network (RAN2) should be activated based on the received information. If it has been determined that a passive cell of the second RAN (RAN2) should be activated, the network unit of the first RAN (RAN1) signals (3) to the relevant RBS of the second RAN to trigger activation of the corresponding cell.

This information (2) representative of radio access preferences of user equipment may for example be carried by Subscriber Profile ID for RAT/Frequency priority (SPID) 3GPP signaling from the core network to the radio access network side and by Idle Mode Mobility Control Information from the radio access network to the UE/mobiles to set mobility preferences during idle mode individually per mobile. In an exemplary embodiment, the first RAN extracts the relevant information of UE radio access preferences based on the SPID signaling from the core network (CN) and then uses this information to determine whether the passive cell of the second overlapping RAN should be activated. For more information on the 3GPP signaling relevant to the above exemplary embodiment, reference can be made to [1, 2].

For example, if LTE is preferred over the current radio access technology (e.g. GSM, WCDMA or CDMA2000), the currently serving first RAN signals to the LTE base station(s) with passive cells having a potential of covering the area where the UE(s) is/are located. The signal(s) causes the LTE RBS(s) to turn on the corresponding cell(s), including transmission of cell-defining information to assist the UE(s) to find and attach to the activated cell(s).

Cells of the second overlapping RAN that have not been carrying user traffic within, or during, a predefined period of time are normally turned off again, meaning that the corresponding radio base station(s) will not be transmitting any cell-defining information for these cells.

In particular, it is thus possible to set such a cell in a passive state in which the corresponding radio base station does not transmit any cell-defining information for the cell if no user data is transmitted by the RBS for the cell within a predetermined period, and preferably also if with the optional condition that no data is received by the RBS for the considered cell during the time period.

For a better understanding, examples of various network contexts in which embodiments can be applied will now be schematically described.

In the following, various exemplary embodiments will be described in more detail, mainly with reference to GSM, CDMA2000, TDSCDMA, or WCDMA communication systems as the RAT for the first RAN, and LTE as the RAT for the second RAN. Most areas where LTE is rolled out already have coverage by at least one other radio access technology, such as GSM, CDMA2000, TDSCDMA or WCDMA. The invention is not limited thereto. Other scenarios are also possible, as previously mentioned.

In an LTE communication system for example, it may be desirable to minimize the number of LTE cells that are turned on. Preferably, only those cells that are need in order to provide the required services should be active. All other cells should be turned off.

In other words, an idea is to have triggered start of operation of the LTE cells, where the trigger is based on an indication that a UE would prefer LTE operation. This allows for prolonging of the idle or passive period of the LTE cell(s) while still maintaining or improving the response time of an LTE attachment.

Typically the UE makes the initial access to another overlay access network, and the LTE system is optionally and selectively turned for example upon reception of access from a LTE capable UE.

Normally LTE will be deployed where there already exist other radio access networks such as GSM, WCDMA, CDMA2000, TDSCDMA, or even LTE of another frequency band. The idea is to have the UEs camp on these standards, and for example when services requiring LTE is started, at least one of the LTE RBSs within the area will be asked to turn the proper LTE cell(s) on.

Exemplary optional advantages include:
Minimal power consumption, as a complete LTE network can be turned off, and activated only when a service requiring LTE is started by an LTE capable UE.
LTE RBSs can be used as spot-wise capacity enhancements. UEs are normally handled via another RAN/RAT, but when LTE is present in the area, a high-traffic user can "start it up".
Lower power consumption since all transmission can be turned off when no (or very low) traffic is present in the cell.

Co-Sited Scenario

A possible deployment for LTE is to reuse the sites of GSM (or a CDMA-based system), e.g. put LTE RBS next to a GSM RBS on the GSM site. Furthermore, the feeders and antenna units may be reused, for appearance reasons and for wind load reasons. Such an example is shown in FIG. 6.

Figure 6:
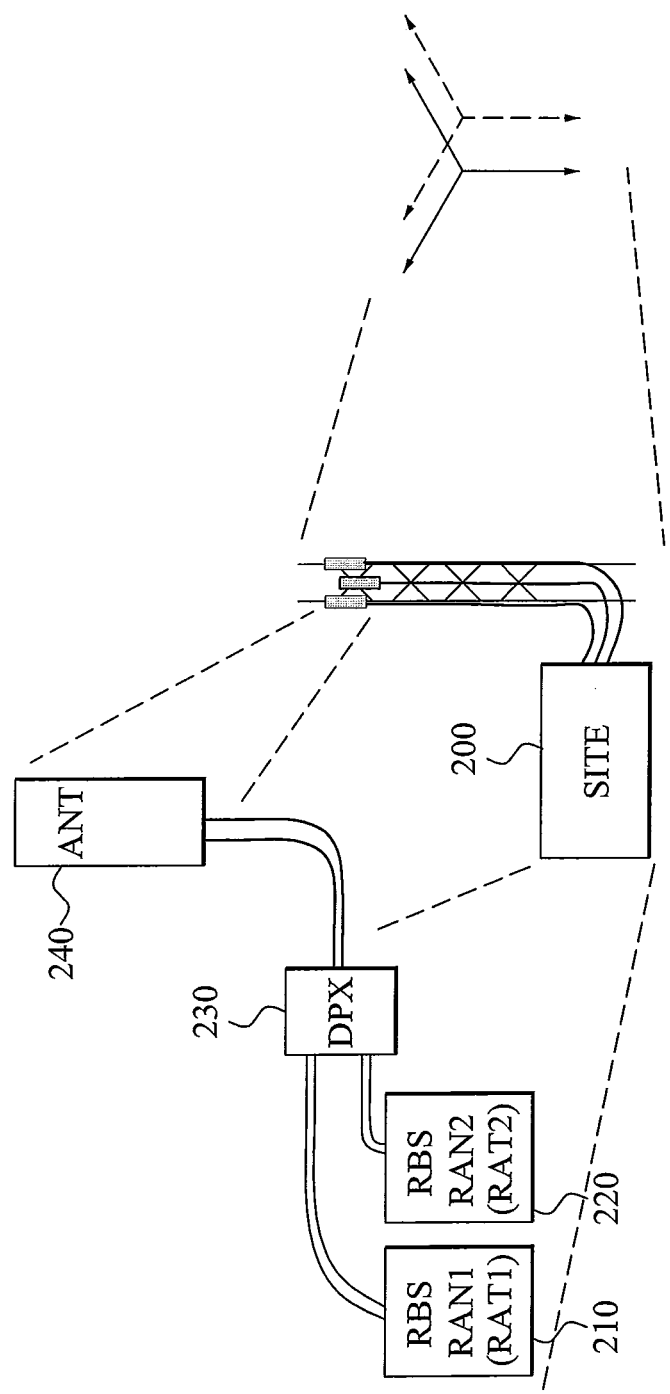
FIG. 6 is a schematic diagram illustrating co-siting of radio base stations of different radio access networks (RANs) and/or different radio access technologies (RATs) according to an exemplary embodiment.

FIG. 6 is a schematic diagram illustrating co-siting of radio base stations of different radio access networks (RANs) and/or different radio access technologies (RATs) according to an exemplary embodiment. FIG. 6 illustrates a co-sited cell representation, a typical physical site 200 with shared feeder cables and antennas, and a more detailed view of the radio base stations (RBSs) 210, 220 and duplex filter 230 in the site 200, as well as a sector antenna 240. The radio base stations 210, 220 may be of different radio access technologies (RATs), typically operating on different frequency bands and having a duplex filter for sharing the feeder. The associated antenna unit 240 typically houses two diversity antennas—one diversity antenna per band. Alternatively, the radio base stations are of the same RAT, but anyway belonging to different radio access networks, e.g. operating on different frequency bands. Of course, also other co-siting solutions exist, with or without shared equipment. The cells are normally virtually overlapping.

Figure 7:
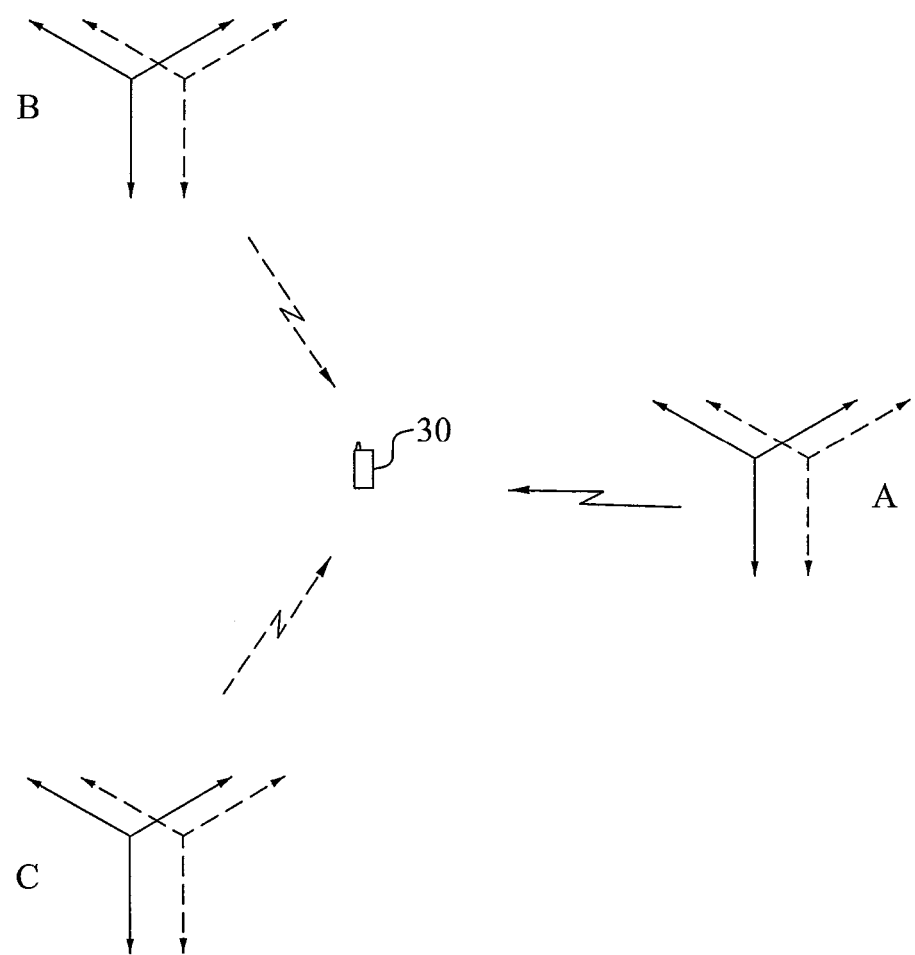
FIG. 7 is a schematic diagram illustrating an example of a common cell plan between different radio access networks (RANs) and/or different radio access technologies (RATs).

FIG. 7 is a schematic diagram illustrating an example of a common cell plan between different radio access networks (RANs) and/or different radio access technologies (RATs). For example, a cell plan of a first RAT such as GSM is indicated by solid arrows and a cell plan a second RAT such as LTE is indicated by dashed arrows. This could for instance be the result of the co-siting as illustrated in FIG. 6.

With reference to FIG. 6, assume that GSM RBS A is the serving RBS for the UE 30, and that all the cells of LTE RBSs in A, B and C are passive.

When it is detected that the UE 30 has a preference for LTE over GSM, the serving GSM RBS A, or another suitable network unit, will decide that it is appropriate to activate an LTE cell and therefore sends a cell-activation command signal to the co-sited LTE RBS via a site-local control interface.

Generic Scenario

When the LTE deployment is extended, not all LTE RBSs will be co-sited with GSM RBSs.

Figure 8B:
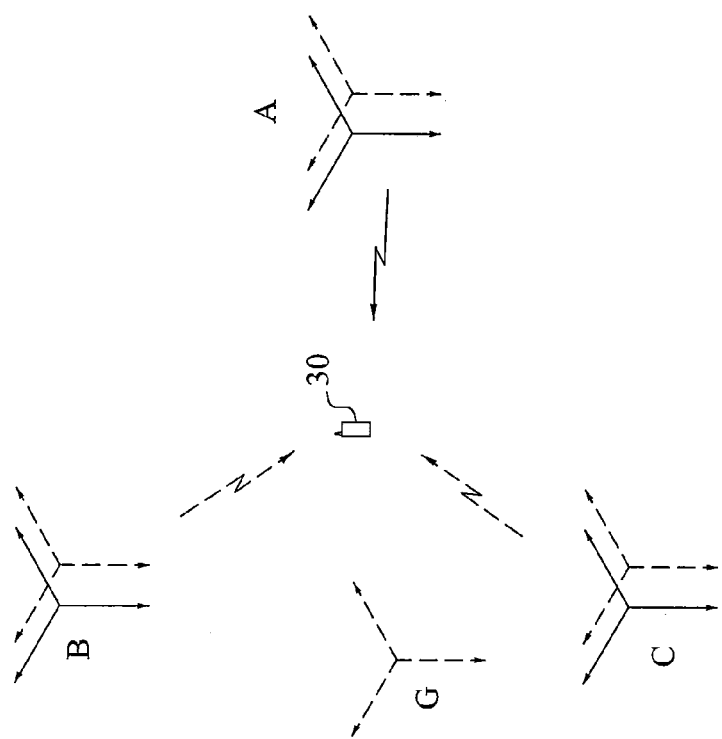
FIG. 8B is a schematic diagram illustrating an example of a partially common cell plan according to an exemplary embodiment.
Figure 8A:
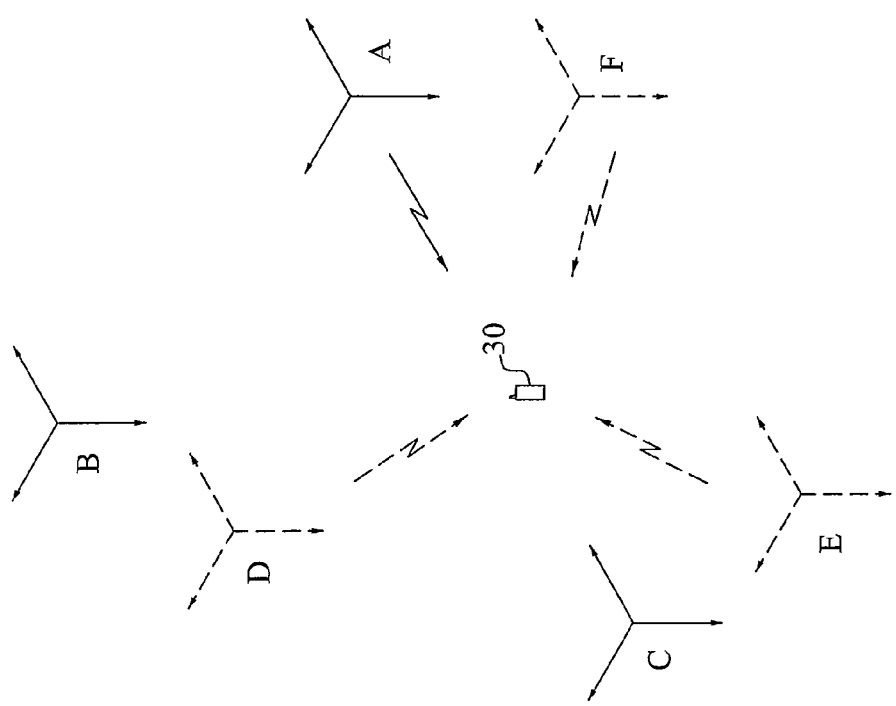
FIG. 8A is a schematic diagram illustrating an example of a cell plan in which radio base stations of different radio access networks (RANs) and/or different radio access technologies (RATs) are not co-sited.

Examples of more generic scenarios will now be outlined with reference to FIGS. 8A-B.

FIG. 8A is a schematic diagram illustrating an example of a cell plan in which radio base stations of different radio access networks (RANs) and/or different radio access technologies (RATs) are not co-sited. This could by way of example represent a scenario in which LTE RBSs are not co-sited with GSM RBSs; perhaps because the other RAT belongs to another operator.

FIG. 8B is a schematic diagram illustrating an example of a partially common cell plan according to an exemplary embodiment. This could by way of example represent a scenario in which an LTE-only RBS G is placed in-between the sites with co-sited RBSs. This can be due to a need for higher capacity in that area for LTE, but not for GSM.

For a more generic case, the GSM RBS(s) typically needs to know which LTE cells are serving the same area as the GSM cells. By way of example, it may be determined that more than one LTE cell should be selected for activation. For example, in the case of FIG. 10B, the serving GSM RBS A may request both LTE RBS C and RBS G to turn on at least some of their respective cells.

The above procedures may be implemented in an apparatus or corresponding controller module by hardware or a suitable combination of software and processing hardware for executing the software.

Figure 9:
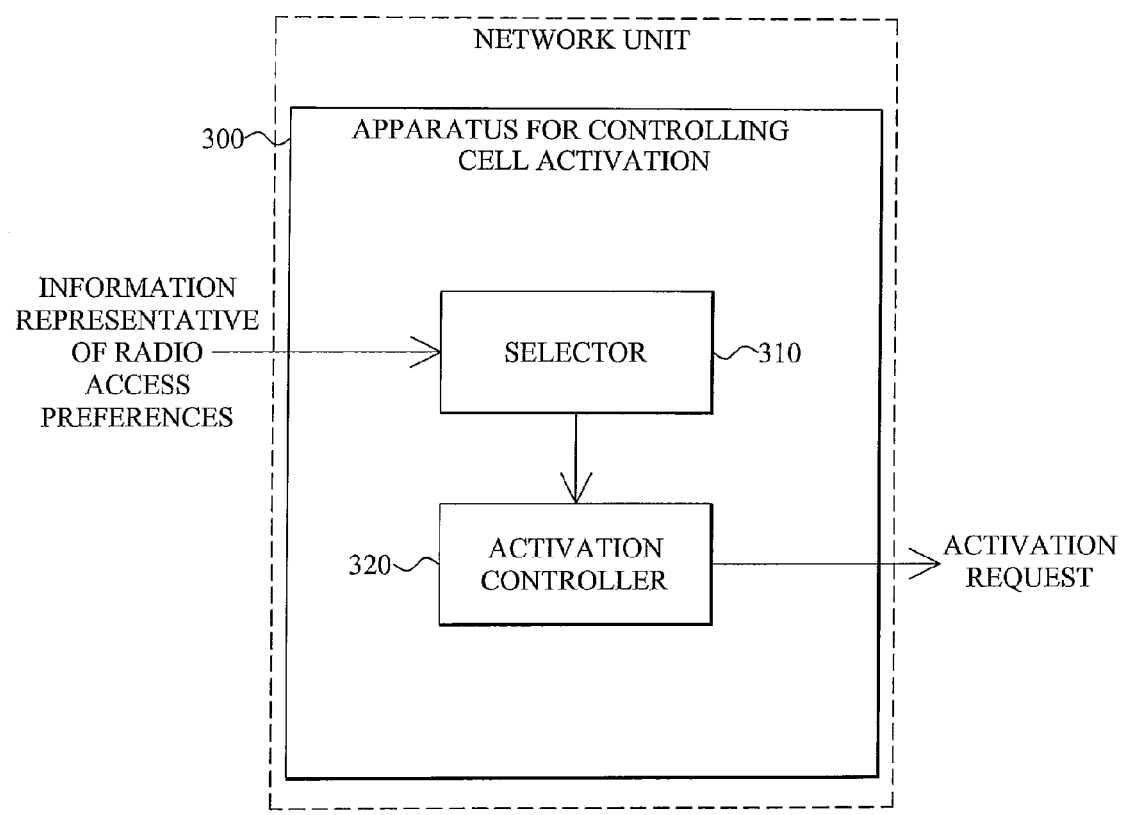
FIG. 9 is a schematic block diagram illustrating an apparatus for controlling activation of at least one cell according to an exemplary embodiment.

FIG. 9 is a schematic block diagram illustrating an apparatus for controlling activation of at least one cell according to an exemplary embodiment. Basically, the apparatus 300 for controlling activation of at least one cell in a radio communication network comprises a selector 310 for selecting, based on information representative of radio access preferences of the user equipment, at least one passive other cell of a radio base station belonging to a second overlapping radio access network for activation. The radio base station belonging to a second overlapping radio access network is currently not transmitting any cell-defining information for the passive other cell. The apparatus 300 also comprises an activation controller 320 for requesting the selected passive other cell or cells to be activated by causing the corresponding radio base station or stations belonging to the second overlapping radio access network to start transmission of cell-defining information to assist the UE in finding the cell for radio communication services.

As previously indicated, the apparatus 300 for controlling cell activation may be implemented in a network unit 25/45/50/55/60/65 associated with the radio communication network. The network unit may for example belong to a radio access network and/or a core network associated with the radio communication network. For example, the network unit may be a Radio Base Station (RBS) 25, a Base Station Controller (BSC) 45, a Radio Network Controller (RNC) 50, a Mobile Switching Center (MSC) 55, a Serving GPRS Support Node (SGSN) and/or Gateway GPRS Support Node (GGSN) 60, or a Mobility Management Entity (MME) node 65.

In an exemplary embodiment, when the network unit in which the apparatus 300 for controlling cell activation is implemented belongs to the radio access network side, the information representative of radio access preferences of the user equipment is preferably received from a core network associated with the radio communication network.

Figure 10:
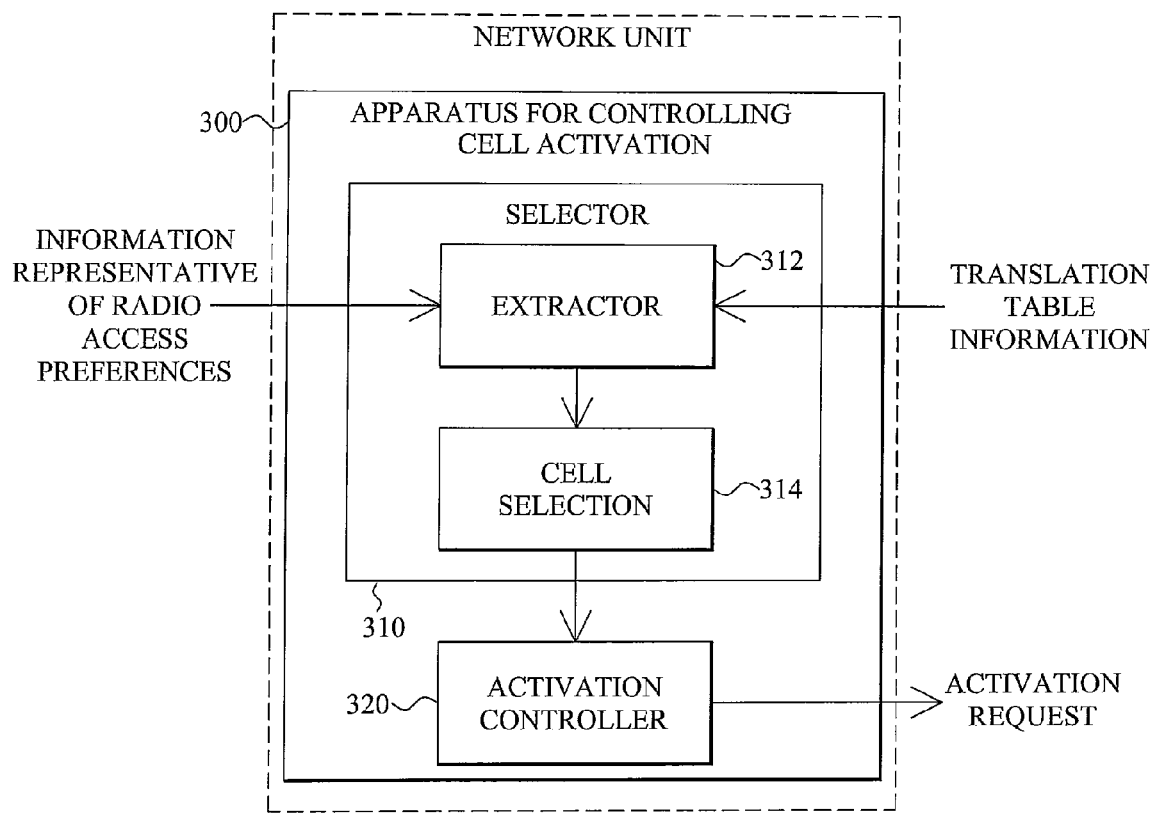
FIG. 10 is a schematic block diagram illustrating an apparatus for controlling activation of at least one cell according to another exemplary embodiment.

Other examples and/or optional features of the apparatus for controlling cell activation will be described below:

FIG. 10 is a schematic block diagram illustrating an apparatus for controlling activation of at least one cell according to another exemplary embodiment. In similarity to the apparatus of FIG. 9, the apparatus of FIG. 10 includes a selector for selecting one or more passive cells of another overlapping radio access network for activation, and activation controller 320 for requesting the selected cell(s) to be activated. In the exemplary embodiment of FIG. 10, the selector 310 includes an extractor 312 and a unit 314 for cell selection.

The extractor 312 is configured for receiving information representative of radio access preferences and uses translation information to interpret the received information of radio access preferences.

For example, information representative of radio access preferences may be carried by Subscriber Profile ID for RAT/Frequency priority (SPID) 3GPP signaling from the core network. The relevant OSS normally has information for translating the SPID signaling into information of UE radio access preferences, and this information is advantageously distributed to the apparatus 300 for controlling cell activation so that the SPID signaling received from the core network may be properly interpreted.

The extracted information on the UE radio access preferences is then forwarded from the extractor 312 to the cell selection unit 314, which is configured to select one or more passive cells of the overlapping RAN based on the UE radio access preferences.

Preferably, the information representative of UE radio access preferences includes information representative of an order of preference of radio access networks.

In an exemplary embodiment, the information representative of radio access preferences includes information representative of radio access capabilities, subscription and/or current service of the considered user equipment.

As previously indicated, it is possible to use complementary information originating from one or both of the first radio access network and the second overlapping radio access network in the cell selection procedure.

The activation controller 320 receives information on one or more passive cells of the second overlapping radio access network to be activated. The activation controller 320 is preferably configured to trigger activation of the passive cell(s) by signaling an activation request to the corresponding radio base station(s) of the second overlapping radio access network requesting this or these base stations to start transmission of cell-defining information.

In the above presented block diagrams of FIGS. 9 and 10, only the units directly involved in the controlled cell activation as disclosed herein are explicitly illustrated. It is therefore anticipated that a network unit, such as a radio base station, a base station controller or radio network controller, including a corresponding apparatus for cell activation also comprises other units and functionalities used in their traditional operations.

Figure 11:
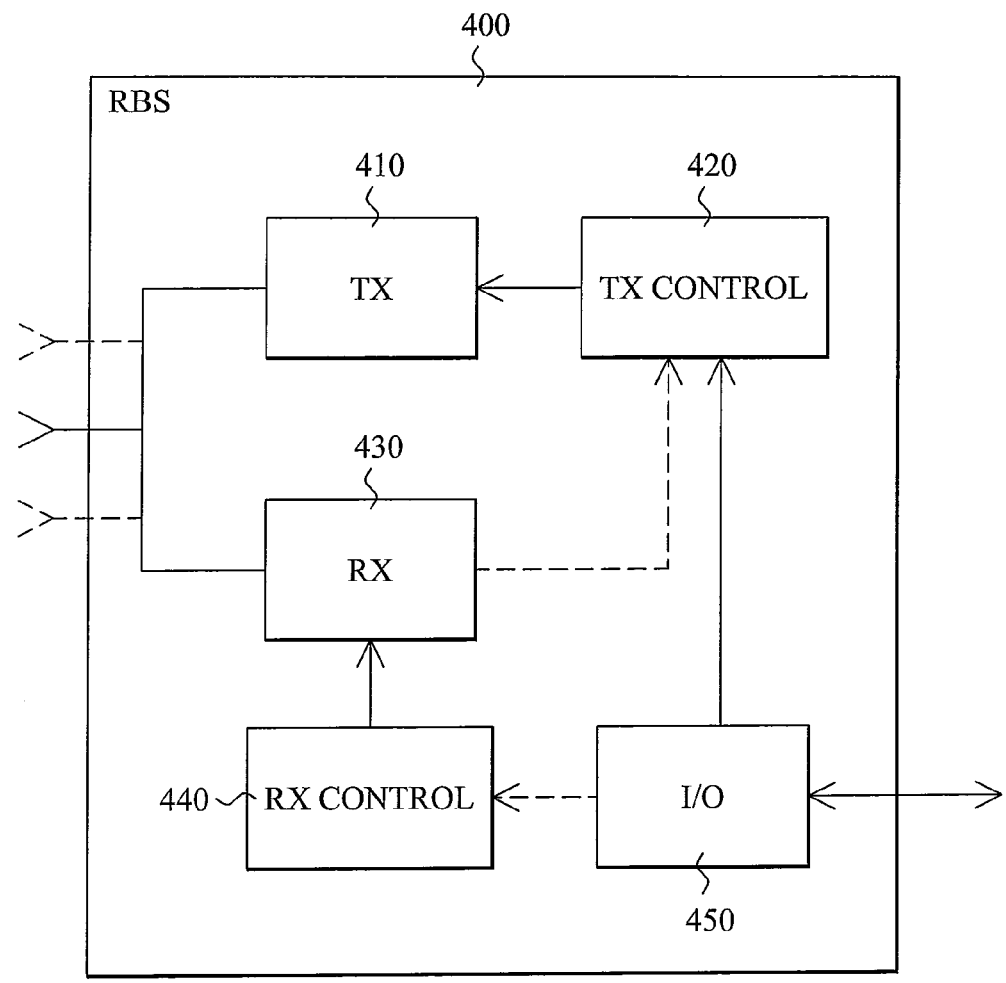
FIG. 11 is a schematic block diagram illustrating an example of a radio base station having transmission and/or reception control capabilities.

FIG. 11 is a schematic block diagram illustrating an example of a radio base station having transmission and/or reception control capabilities. Basically, the radio base station (RBS) 400 includes a transmitter (TX) 410 and associated antenna(s), a transmitter control unit 420, a receiver (RX) 430 and associated antenna(s), a receiver control unit 440, and an input/output (I/O) unit 450.

In a radio base station responsible for a passive cell to be activated, there is typically a transmitter control unit 420 that is capable of activating the passive cell by controlling the transmitter 410 to start transmission of cell-defining information for the cell. The radio base station may also have access to a timer (not shown), and when this timer has expired and/or no or only very low amount of active traffic is or has been present in the active cell as detected by conventional means, the transmitter control unit 420 may for example inactivate the cell by controlling the transmitter 410 to stop the transmission of the cell-defining information for the cell.

The transmitter control unit 420, also referred to as a transmitter controller, may be associated with the power amplifier, the baseband processing as well as the actual transmission equipment in the radio base station.

As mentioned above, there are many ways of requesting the radio base station and the transmitter control unit 420 to activate a cell. For example, this information may be signaled as a cell activation command via the I/O unit 450, but it may also be provided, e.g. through a random access (RA) received from user equipment via the receiver 430 as indicated by the dashed line.

The base station 400 may also have an optional receiver control unit 440, also referred to as a receiver controller, which controls the receiver 430 so that it is activated or inactivated for a specific cell.

As a final example, reference will now be made to the flow diagrams of FIGS. 12 and 13, which schematically illustrate an exemplary procedure based on Subscriber Profile ID for RAT/Frequency priority (SPID) 3GPP signaling from the core network and so-called RAN filtering to determine which cell(s) to activate.

Figure 12:
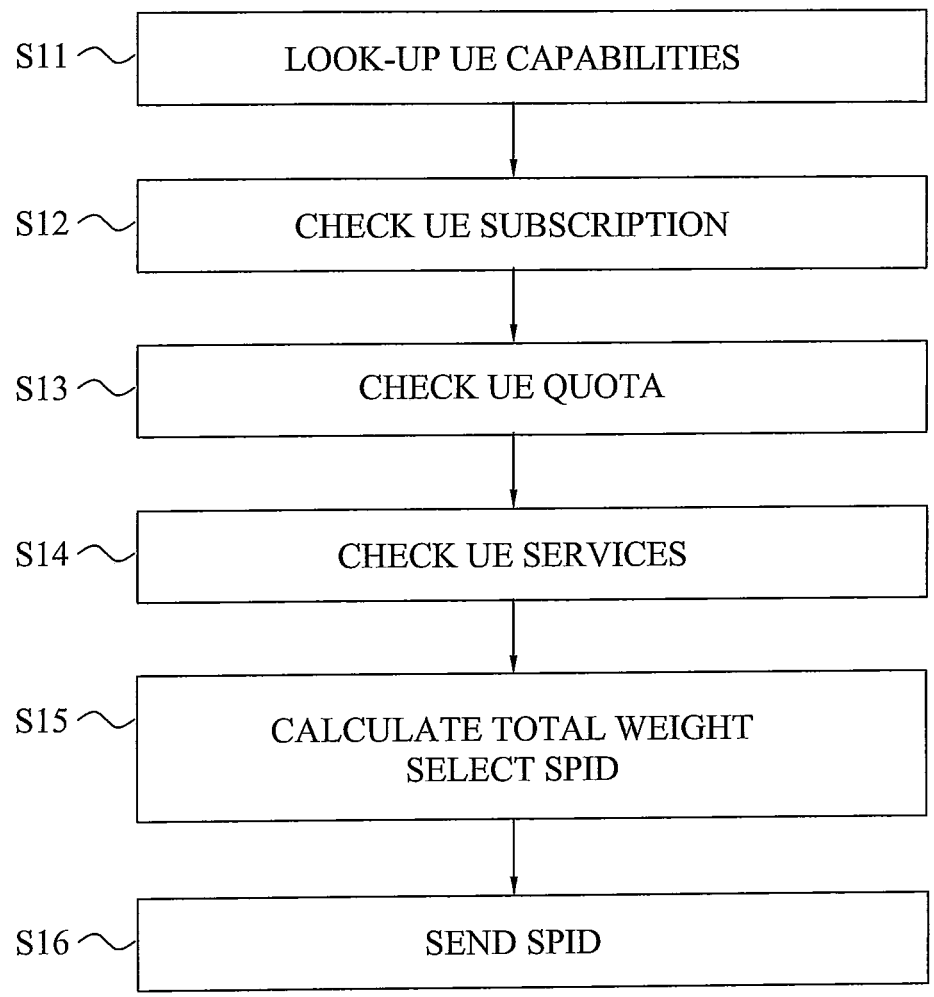
FIG. 12 is a schematic flow diagram illustrating a particular example of how information is selected for transfer using the exemplary Subscriber Profile ID for RAT/Frequency priority (SPID) 3GPP signal.

FIG. 12 is a schematic flow diagram illustrating a particular example of how information is selected for transfer using the exemplary Subscriber Profile ID for RAT/Frequency priority (SPID) 3GPP signal. As previously mentioned, the core network (CN) may send information about the preferences to the radio access network (RAN) node. In this particular example, the information is the SPID, a number representing an entry in a configured table. The table may have many entries stating that the second RAN shall be preferred. This can be used to transfer also a "weight" for the information: If a UE would benefit from having LTE but it is not crucial, it will have a low weight. The SPID 1-10 could then indicate "LTE 700 preferred, with weight <SPID>", and SPID 11-20 could indicate "LTE 2600 preferred, with weight <SPID-10>", and so forth. This would allow for a "filtering" in the RAN before turning on one or more cells in the second RAN. Alternatively, the CN implements the filtering of weight of preferred RAN. When the sum of weights for UEs within a selected area (e.g. routing area or paging) are high enough a signal to turn on the second RAN for that area, the SPID for "LTE 2600 preferred" is signaled.

To determine the preferred access and weight, the core network (CN) may use one or more of step S11-S14:

In step S11, the CN looks at the UE capabilities.

In step S12, the CN checks the static UE subscription. Is it allowed to use the second RAN? Does the subscription motivate a high weight (a gold user)?

In step S13, the CN checks the dynamic UE subscription. Has the user already used its monthly quota (if any)? If so, the weight may be decreased, or another RAN may be selected.

In step S14, the CN checks the setup services, and checks if they would benefit from the second RAN. If so, the weight is then increased.

Steps S11 and S12 are typically evaluated at UE connection setup. Steps S13 and S14 can be updated during the time the UE is connected.

In step S15, the total weight is calculated and the best matching SPID is selected. The CN may optionally include information about the weight of other UEs, e.g. within the routing area when selecting SPID. This would be beneficial if no filtering of weights is done in the RAN. It is though normally preferred to have the filtering in RAN.

In step S16, the SPID is sent to the RAN node.

Figure 13:
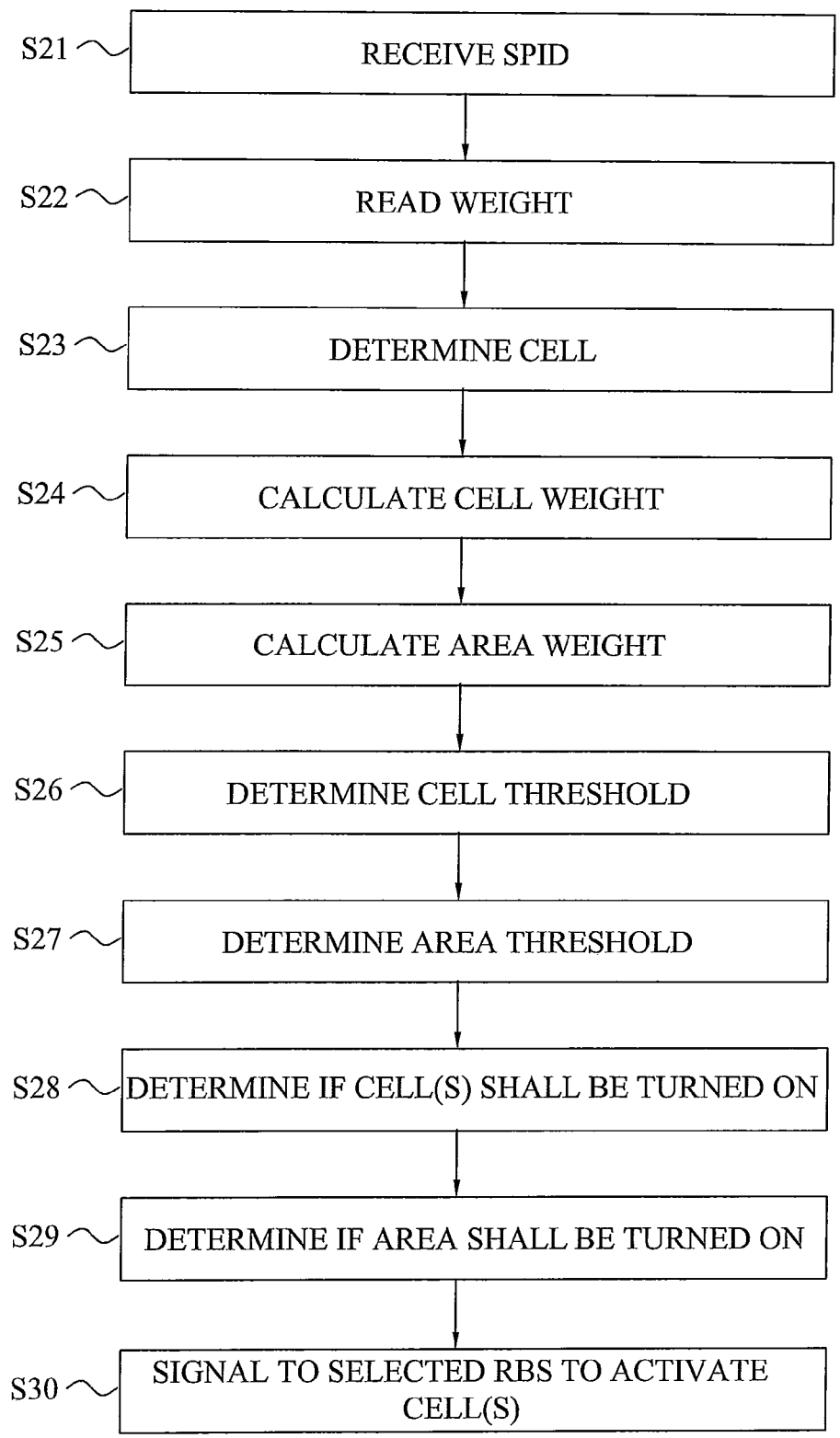
FIG. 13 is a schematic flow diagram illustrating a particular example of how the radio access network side may determine to initiate activation of selected cells according to an exemplary embodiment.

FIG. 13 is a schematic flow diagram illustrating a particular example of how the radio access network side may determine to initiate activation of selected cells according to an exemplary embodiment. The RAN node determines if the second RAN shall be turned on by evaluating the total weight received from the SPID signal(s). The weight may be evaluated based on different criteria:

Is the combined weight higher than a preconfigured threshold?

Is the combined weight high, and the load of the served cells high?

Based on this, one or more passive cells may be turned on. A special case is of course that the load of the served cells is very high, and the SPID indicates that a UE can be moved to the second RAN. That may be a trigger to turn on a second cell.

In step S21, the RAN node receives the SPID for a certain UE. In step S22, the SPID is used to read out the weight from the preconfigured table. In step S23, the RAN determines which cell of the second RAN would be the target cell in case of an inter-RAT handover. The RAN node may find multiple cells to be plausible. In step S24, the RAN node calculates the weight per cell in the second RAN. The calculation may take into account the probability that any of the UEs moves in or out of the cell, i.e. is close to the cell border and/or is moving fast. The calculation may also take into account that a user has bad coverage in the first RAN and would be better served by the second RAN, and would then correspondingly increase the weight. The calculation may also take into account if the UE requires a lot of air interface resources, e.g. has a combination of bad channel and high bit-rate. The RAN would then benefit from having the UE move to the second RAN, assuming the second RAN is better for serving high speed users. In step S25, the RAN node calculates the weight per area in the second RAN. Many different areas may exist in the second RAN, and can be defined by configuration. Examples may be: a routing area, a hierarchical layer, and/or a set of cells covering an office area.

In step S26, the RAN node determines the cell threshold. The threshold can for example be a combination of a preconfigured fixed value and a function of the load in the serving cell in the first network. If the load is high in the serving network, the threshold is preferably decreased to even out the load between the RANs. In step S27, the RAN node determines the area threshold. As for the cell threshold, the area threshold value can be a combination of a preconfigured value and the load of the first RAN. The purpose of the area threshold is to be able to have a high per-cell threshold: One user in one cell shall seldom result in the second RAN being turned on, but one user in many cells in a larger area may.

In step S28, the calculated cell weight and cell threshold are compared to determine if any of the passive cells of the second RAN shall be turned on. In step S29, the calculated area weight and area threshold are compared to determine if any of the passive cells in the corresponding area of the second RAN shall be turned on.

In step S30, the determined cells, if any, are turned on by means of signaling.

Steps S23 to S29 are preferably evaluated repeatedly as the load changes or the UE moves.

The RAN part works also if the CN only has 1 SPID for the exemplary case of "UE prefers LTE". That would correspond to each UE preferring LTE having equal weight.

The CN part works fine also when having no special filtering in the RAN. The CN would then do the corresponding filtering and send the SPID corresponding to the exemplary case of "UE prefers LTE" only when the CN wants LTE to be turned on. Optionally, the CN does not use the SPID in this case but sends the signal directly to the OSS of the second RAN.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] TS 36.300 version 8.7.0, 3GPP
[2] TS 36.413 version 8.4.0, 3GPP

The invention claimed is:

1. A method of controlling activation of at least one cell in a radio communication network comprising a number of radio base stations, at least one of said radio base stations belonging to a first radio access network and managing at least one active cell serving one or more user equipment, said method comprising:

determining, by at least one network unit of the first radio access network, whether a passive other cell of a radio base station belonging to a second overlapping radio access network should be activated based on information representative of radio access preferences of said user equipment, wherein said radio base station belonging to the second overlapping radio access network is currently not transmitting any cell-defining information for said passive other cell, and wherein said information representative of radio access preferences of said user equipment is received by said at least one network unit from a core network associated with said radio communication network;

requesting, by said at least one network unit of the first radio access network when it is determined that said passive other cell should be activated, said passive other cell to be activated by causing the corresponding radio base station belonging to said second overlapping radio access network to start transmitting cell-defining information.

2. The method of claim 1, wherein said information representative of radio access preferences of said user equipment includes information representative of at least one of radio access capabilities, subscription, and current service of said user equipment.

3. The method of claim 1, wherein said information representative of radio access preferences of said user equipment includes information representative of expected or known radio access capabilities.

4. The method of claim 1, wherein said information representative of radio access preferences of said user equipment corresponds to information representative of an order of preference of radio access networks.

5. The method of claim 4, wherein said information representative of an order of preference of radio access networks includes an indication that said user equipment has a preference for said second overlapping radio access network over said first radio access network.

6. The method of claim 1, wherein said first radio access network is associated with a first radio access technology, and said second overlapping radio access network is associated with a second different radio access technology.

7. The method of claim 1, wherein said information representative of radio access preferences of said user equipment is carried by Subscriber Profile ID for RAT/Frequency priority (SPID) signaling from said core network.

8. The method of claim 1, wherein determining whether said passive other cell should be activated is further based on information originating from at least one of said first radio access network and said second overlapping radio access network.

9. The method of claim 1, wherein said at least one network unit comprises at least one of a radio base station (RBS), a base station controller (BSC), and a radio network controller (RNC) of said first radio access network.

10. The method of claim 1, wherein said step of determining and said step of requesting are further performed by at least one network unit of a core network associated with said radio communication network such that the determining and requesting steps are distributed between the one or more network units of the first radio access network and the one or more network units of the core network.

11. The method of claim 1, wherein requesting said passive other cell to be activated comprises triggering activation of said passive cell by signaling to the corresponding radio base station belonging to said second overlapping radio access network to start transmitting the cell-defining information.

12. An apparatus for controlling activation of at least one cell in a radio communication network comprising a number of radio base stations, at least one of said radio base stations belonging to a first radio access network and managing at least one active cell serving one or more user equipment, said apparatus comprising:
a selector configured to select, based on information representative of radio access preferences of said user equipment, at least one passive other cell of a radio base station belonging to a second overlapping radio access network for activation, wherein said radio base station belonging to the second overlapping radio access network is currently not transmitting any cell-defining information for said at least one passive other cell;
an extractor configured for extracting said information representative of radio access preferences of said user equipment based on Subscriber Profile ID for RAT/Frequency priority (SPID) signaling from a core network associated with said radio communication network;
an activation controller configured to request said selected at least one passive other cells to be activated by causing the corresponding radio base station belonging to said second overlapping radio access network to start transmitting cell-defining information.

13. The apparatus of claim 12, wherein said information representative of radio access preferences of said user equipment includes information representative of at least one of radio access capabilities, subscription, and current service of said user equipment.

14. The apparatus of claim 12, wherein said information representative of radio access preferences of said user equipment includes information representative of an order of preference of radio access networks.

15. The apparatus of claim 12, wherein said first radio access network is associated with a first radio access technology, and said second overlapping radio access network is associated with a second different radio access technology.

16. The apparatus of claim 12, wherein said selector is further configured to select said at least one passive other cell based on information originating from at least one of said first radio access network and said second overlapping radio access network.

17. The apparatus of claim 12, wherein said activation controller is further configured to trigger activation of said at least one passive other cell by signaling to the corresponding radio base station belonging to said second overlapping radio access network to start transmitting the cell-defining information.

18. A network unit for use in a radio communication network, said network unit comprising an apparatus for controlling activation of at least one cell in a radio communication network comprising a number of radio base stations, at least one of said radio base stations belonging to a first radio access network and managing at least one active cell serving one or more user equipment, said apparatus comprising:
a selector configured to select, based on information representative of radio access preferences of said user equipment, at least one passive other cell of a radio base station belonging to a second overlapping radio access network for activation, wherein said radio base station belonging to the second overlapping radio access network is currently not transmitting any cell-defining information for said at least one passive other cell;
an extractor configured for extracting said information representative of radio access preferences of said user equipment based on Subscriber Profile ID for RAT/Frequency priority (SPID) signaling from a core network associated with said radio communication network;
an activation controller configured to request said selected at least one passive other cells to be activated by causing the corresponding radio base station belonging to said second overlapping radio access network to start transmitting cell-defining information.

19. The network unit of claim 18, wherein said network unit belongs to at least one of said first radio access network and said core network of said radio communication network.

20. The network unit of claim 19, wherein said network unit comprises at least one of a radio base station (RBS), a base station controller (BSC), and a radio network controller (RNC).

* * * * *